United States Patent [19]

Kaneyuki

[11] Patent Number: 4,627,309
[45] Date of Patent: Dec. 9, 1986

[54] ACCESSORY DRIVE DEVICE IN ENGINE

[75] Inventor: Kazutoshi Kaneyuki, Hyogo, Japan

[73] Assignee: Mitsubishi Denki Kabushiki Kaisha, Tokyo, Japan

[21] Appl. No.: 802,749

[22] Filed: Nov. 29, 1985

[30] Foreign Application Priority Data

Nov. 30, 1984 [JP] Japan ................. 59-182907

[51] Int. Cl.$^4$ .............. F16H 17/06; F16H 15/50; F16H 15/16
[52] U.S. Cl. ................. 74/752 C; 74/192; 74/796
[58] Field of Search .......... 74/191, 192, 752 C, 74/796

[56] References Cited

U.S. PATENT DOCUMENTS

| | | | |
|---|---|---|---|
| 2,953,039 | 9/1960 | McRae | 74/796 X |
| 3,108,496 | 10/1963 | Kashihara | 74/796 |
| 3,108,497 | 10/1963 | Kashihara | 74/796 |
| 4,232,561 | 11/1980 | Kashihara et al. | 74/796 X |
| 4,468,984 | 9/1984 | Castelli et al. | 74/191 X |

FOREIGN PATENT DOCUMENTS

| | | |
|---|---|---|
| 58-86434 | 6/1983 | Japan . |
| 58-200838 | 11/1983 | Japan . |
| 59-22345 | 2/1984 | Japan . |
| 59-86455 | 6/1984 | Japan . |

Primary Examiner—Allan D. Herrmann
Attorney, Agent, or Firm—Bernard, Rothwell & Brown

[57] ABSTRACT

A device which drives accessories such as an alternator or a cooling water pump utilizing output of an automobile engine, includes an input shaft rotating at speed corresponding to an output shaft of the engine, and a nonstage transmission installed between the shaft and a pulley connected to the accessories. The nonstage transmission is provided with a planetary cone rotating in revolution around the input shaft and also in self-rotation, and a shifting ring engaged in frictional engagement with the conical surface of the planetary cone and movable along the axial direction of the pulley, thereby the transmission ratio corresponding to displacement of the gear shifting ring is obtained. Variation of the position of the shifting ring is performed by action of a hydraulic piston/cylinder assembly working at hydraulic pressure corresponding to the rotational speed of the pulley.

5 Claims, 4 Drawing Figures

CENTER OF ROTATION

ACCESSORY DRIVE DEVICE IN ENGINE

BACKGROUND OF THE INVENTION

1. Field of the Invention

The present invention relates to a device for driving various accessories such as an alternator, a cooling water pump or the like, utilizing power of an engine of an automobile or the like.

2. Description of the Prior Art

In an engine of an automobile or the like, accessories such as an alternator, a cooling water pump, an air-conditioning compressor, an oil pump for hydraulic servo steering or the like are belt-driven by a crank pulley installed at an end of a crank shaft. Since the accessory drive is accompanied with large power loss during the high speed running of the engine, in order to avoid it, various methods have been proposed that gear shifting of a crank pulley is performed with respect to the engine rotational speed and the running speed of the accessory is limited.

For example, Japanese patent application laid-open No. 200838/1983 discloses technology that a reduction drive system comprising a planetary reduction gear and a one-directional clutch, and a direct-coupled drive system comprising a lock-up clutch composed of a hydraulic piston are constituted between a crank shaft and a crank pulley of an engine, thereby the rotational speed of the crank pulley is selectively changed at two stages with respect to the engine rotational speed. In the prior art, however, since rapid speed variation is produced at the speed changing state, variation of the driving force of a accessory applies the variation shock to the vehicle driving force of the engine, thereby the running stability of the vehicle is deteriorated and resulting in unpleasantness to the driver. Moreover, there are problems in durability of the planetary reduction gear and noise is liable to occur. Consequently, this method is not practicable.

On the other hand, for example, Japanese utility model application laid-open No. 86434/1983 discloses technology utilizing a variable pitch pulley to vary effective pitch diameter, wherein a driving pulley of variable pitch is installed on a crank shaft, and a driven pulley also with variable pitch follows the driving pulley and integrally connects an accessory drive pulley. A movable sheave of the driven pulley is controlled by a hydraulic cylinder so as to control the accessory drive speed.

In this example of the prior art, the high hydraulic source is required to control the movable sheave of the drive pulley, and structure of the hydraulic actuator is considerably complicated. Further a comparatively wide installation space projecting in the crank axial direction of the engine is required. Consequently, this method is not suitable for a front wheel drive car with the engine laterally installed which is commonly used, because there is insufficient installation space.

SUMMARY OF THE INVENTION

In order to eliminate above-mentioned disadvantages in the prior art, an object of the invention is to provide an accessory drive device of an engine, wherein shock or noise does not occur during the gear shifting, the installation space is sufficient to enable the replacement for a usual crank pulley, and the rotational speed of the accessory drive pulley can be automatically varied with respect to the engine rotational speed so that it becomes approximately constant while the engine is running at intermediate or high speed.

An accessory drive device of an engine according to the invention includes a nonstage transmission with differential planetary mechanism of a frictional transmission system installed between a crank shaft and a crank pulley, a skimming action hydraulic pressure generating mechanism employing a Pitot tube for transmission of operation power for the nonstage transmission utilizing a frictional transmission oil infused within the nonstage transmission, and a hydraulic cylinder driven by the hydraulic pressure.

According to constitution of the invention, a transmission and a transmission actuator can be constituted integrally in compact structure within an inner circumferential space of a usual crank pulley, frictional driving system enables running at low noise, and the mechanism of the transmission actuator of hydraulic action by skillfully utilizing the skimming action of a Pitot tube can be manufactured simply at low cost.

DETAILED DESCRIPTION OF THE PREFERRED EMBODIMENT

An embodiment of the invention will now be described referring to the accompanying drawings.

Figure 1:
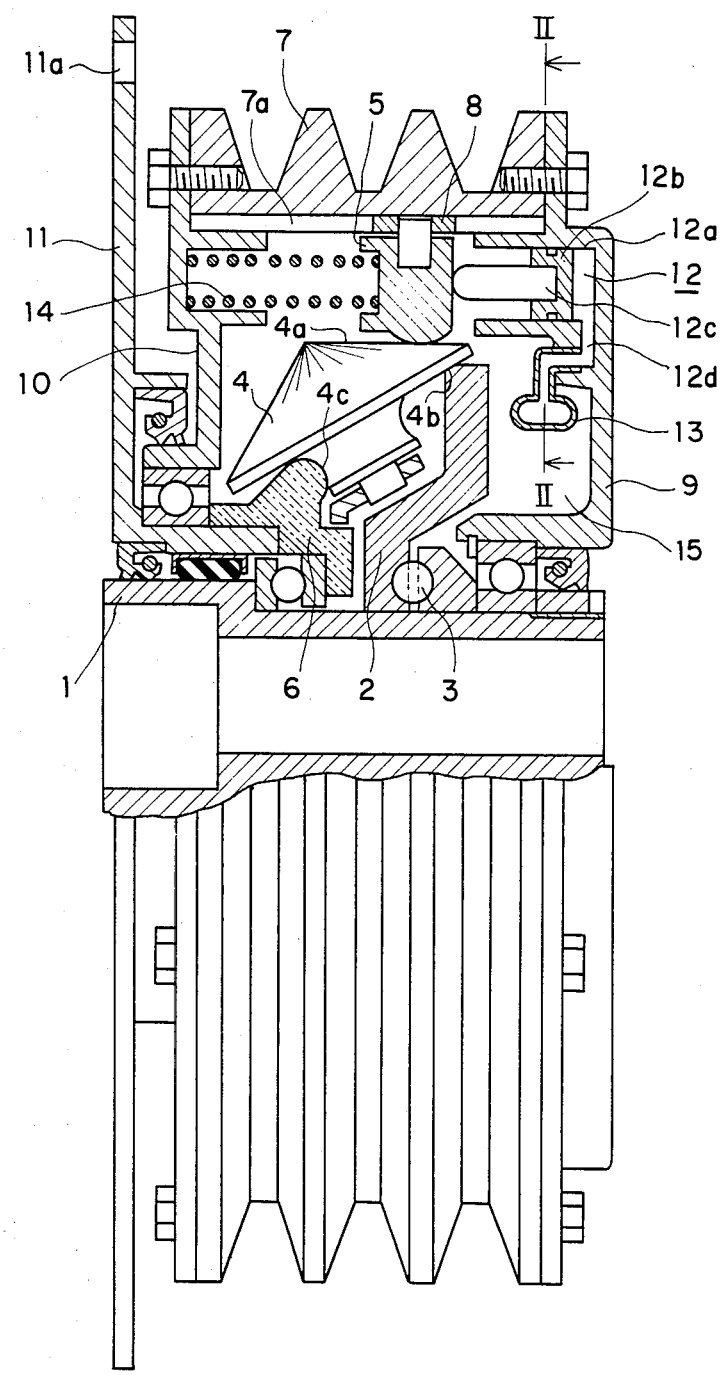
FIG. 1 is a side view of an accessory drive device of an engine according to the invention, partly cut away to reveal the inside thereof.

In FIG. 1, reference numeral 1 designates an input shaft directly coupled to an output shaft such as a crank shaft of an engine, numeral 2 an input transmission member supported by the input shaft, and numeral 3 a cam device for generating pressure interposed between the input shaft 1 and the input transmission member 2. Numeral 4 designates a plurality of cone friction wheels or planetary cones, each composed of a frictional transmission surface 4a on a conical surface, a frictional transmission surface 4b on a bottom surface of each cone, and a frictional transmission surface 4c on a circumferential surface of each shaft leading to the bottom surface of cone. Numeral 5 designates a shifting ring which is engaged in frictional engagement with the frictional transmission surface 4a of the planetary cone 4 and moved in the axial direction so as to vary the frictional transmission radius of the planetary cone 4, and numeral 6 an orbit ring which is engaged in frictional engagement with the frictional transmission surface 4c of the planetary cone 4 and, in its non-rotation state, guides rotation of the planetary cone 4 about the input shaft 1, i.e., the revolution. The frictional transmission surface 4b of the planetary cone 4 is engaged in frictional engagement with outer circumferential edge of the input transmission member 2. The cam force of the cam device 3 acting to move the input transmission member 2 in the axial direction acts as the pressure in the normal direction of the frictional transmission surfaces 4a, 4b, 4c of the planetary cone 4, and its acting direction and amount are set so as to provide balance with the reaction applied to the gear shifting ring 5, the input transmission member 2 and the orbit ring 6, respectively. Numeral 7 designates an accessory drive pulley, numeral 7a a plurality of key grooves on inner circumferential surface of the pulley 7 in the axial direction, and numeral 8 a roller key which transmits the rotational force of the gear shifting ring 5 to the pulley 7 and suppresses the movement in the axial direction and is engaged with the grooves 7a. Numerals 9, 10 designate side plates to support the pulley 7 at both ends. Neral 11 designates a stationary plate which fixedly supports the orbit ring 6 and is securely supported by a mounting part 11a to the stationary member of the engine.

Figure 2:
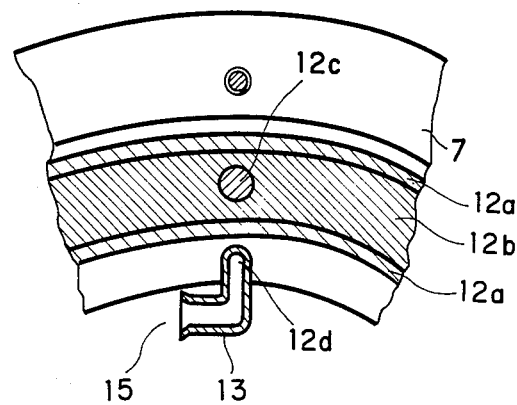
FIG. 2 is a sectional view taken along line II—II of FIG. 1.

A transmission actuator to move the shifting ring 5 in the axial direction comprises a hydraulic piston/cylinder assembly 12 constituted to push the shifting ring 5 in the axial direction. The piston/cylinder assembly 12 is provided with a cylinder 12a integral with the side plate 9, a ring-like piston 12b, a plurality of rods 12c fixed to the piston 12b and abutting on the gear shifting ring 5, and a flow path 12d to guide the acting hydraulic pressure. Numeral 13 designates a Pitot tube which communicates with the flow path 12d at one end and has the other end opened forward in the rotational direction of the side plate 9 as shown in FIG. 2. Numeral 14 designates a return spring.

In the device constituted as above described, the closed space surrounded by the pulley 7, the side plates 9, 10 and the input shaft 1 is filled with a frictional transmission oil 15 as medium for the frictional transmission.

Operation of the embodiment in the above constitution will be described. The driving force of the input shaft 1 is transmitted through the cam device 3 to the input transmission member 2, thereby the planetary cone 4 rotates on its own axial center, and at the same time performs the revolution around the axial center of the input shaft 1 along the frictional transmission surface 4c with the orbit ring 6 being the stationary element. The shifting ring 5 engaged in frictional engagement with the frictional transmission surface 4a of the planetary cone 4 is rotated around the axial center of the input shaft 1 at the speed determined on the basis of the differential action between the self-rotation and the revolution of the planetary cone 4 and the transmission radius ratio, and drives the pulley 7 through the roller key 8. The rotational speed ratio between the input shaft 1 and the shifting ring 5 can be arbitrarily set by moving the shifting ring 5 in the axial direction so that the effective radius ratio of the frictional transmission between the input shaft 1 and the shifting ring 5 becomes a prescribed value.

Figure 3:
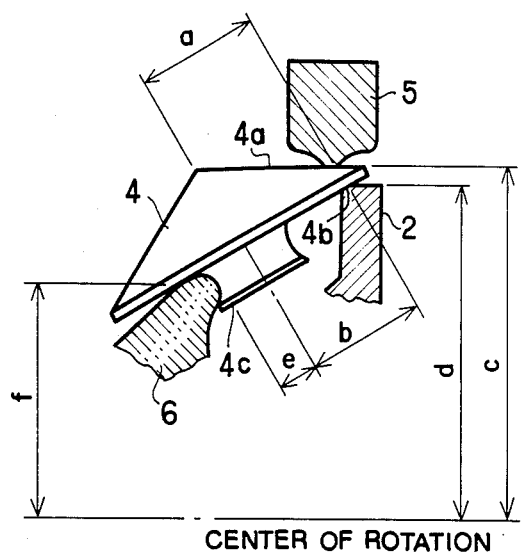
FIG. 3 shows a planetary cone and a member contacting thereto in the drive device shown in FIG. 1 illustrating contacting point and relative dimension.

FIG. 3 illustrates the effective radius a-f of each element of the transmission system in the drive device shown in FIG. 1. Assuming that rotational speed of the input shaft 1 be $N_1$ and rotational speed of the gear shifting ring 5 be $N_2$, it follows that $$N_2/N_1 = \frac{d(ec + fa)}{c(ed + fb)}$$

If the value of a is varied, $N_2/N_1$, i.e., ratio of the rotational speed of the pulley 7 to that of the input shaft 1, can be arbitrarily varied.

Effective radius a-f is as follows:

a: effective radius of the frictional transmission surface 4a of the planetary cone 4 to the shifting ring 5.
b: effective radius of the frictional transmission surface 4b of the planetary cone 4 to the input transmission member 2.
c: inner radius of the shifting ring 5.
d: effective radius of the input transmission member 2.
e: effective radius of the frictional transmission surface 4c of the planetary cone 4 to the orbit ring 6.
f: effective radius of the orbit ring 6.

Figure 4:
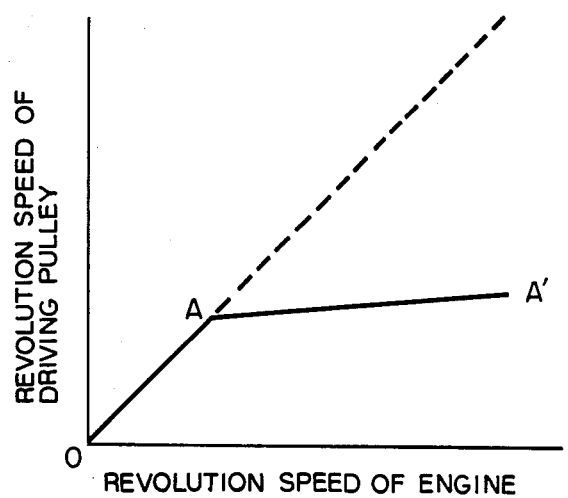
FIG. 4 is a graph illustrating rotational speed of an accessory drive pulley versus rotational speed of an engine.

The position of the shifting ring 5 in the axial direction is controlled by the hydraulic cylinder 12 as hereinafter described. Since the Pitot tube 13 rotates integrally with the side plate 9, the frictional transmission oil 15 is received at the opening of the Pitot tube 13 and thereby pump action is effected to introduce the hydraulic pressure through the flow path 12d to the hydraulic cylinder 12. The hydraulic pressure generated then has an amount proportional to square of the relative rotational speed between the Pitot tube 13 and the frictional transmission oil 15. On the other hand, since the rotational speed of the Pitot tube 13 is equal to that of the pulley 7, output of the hydraulic cylinder 12 varies depending on the rotational speed of the pulley 7. For example, when the input of the hydraulic cylinder 12 increases, the shifting ring 5 is pushed towards the cone vertex of the planetary cone 4. As a result, speed of the pulley 7 is reduced and the hydraulic pressure from the Pitot tube 13 is reduced and output of the hydraulic cylinder is decreased by receiving a negative feedback. In the reverse operation, a positive feedback is added. Accordingly, since the output of the hydraulic cylinder 12 continuously controls the axial position of the shifting ring 5 in equilibrium to the reaction of the return spring 14, the rotational speed of the pulley 7 can be made approximately constant regardless of variation in the rotational speed of the input shaft 1. In FIG. 4 illustrating an example of the rotational speed control characteristics, the abscissa represents the engine rotational speed and the ordinate represents the accessory drive pulley rotational speed in the accessory drive device of the invention. In the region shown by line OA of FIG. 4, the rotational speed of the engine, i.e., the input shaft 1 is low and also the rotational speed of the pulley 7 is low and the output of the hydraulic cylinder 12 is low, thereby when the shifting ring 5 is pushed away from the cone vertex of the planetary cone 4 by the load of the return spring 14, the pulley 7 has the same rotational speed as that of the engine. In the region shown by line AA' of FIG. 4, output of the hydraulic cylinder 12 is in equilibrium to the reaction of the return spring 14, and even if the engine rotational speed rises the rotational speed of the pulley 7 is controlled to remain approximately constant. In addition, the pulley 7 may be constituted by another transmission output member such as a sprocket or a gear.

Accordingly to the invention as above described, since the nonstage transmission of the differential planetary mechanism of the frictional transmission type and the transmission actuator comprising the hydraulic cylinder acting by the skimming action, hydraulic pressure of the Pitot tube acting in the frictional transmission oil infused within the transmission are constituted integrally in a compact structure within the inner circumferential space of a usual crank pulley, the installation space is sufficiently wide to enable the replacement for the usual crank pulley, the frictional transmission is not accompanied with noise during running, the mechanism of the transmission actuator is simple and made at low cost, and the rotational speed of the accessory drive pulley can be controlled to remain approximately constant from an intermediate range of the engine rotational speed, thereby providing energy saving operation of the accessories and improving the fuel cost of engine and the power performance.

What is claimed is:

1. A device for driving accessories such as an alternator, a cooling water pump, an air-conditioning compressor or the like, utilizing power taken from an output shaft of an engine, said device comprising:

an input shaft rotatably supported by a stationary element and receiving output from said output shaft and rotated at a rotational speed corresponding to that of said output shaft;

a transmission output member rotatably supported on said input shaft for transmitting power to said accesories;

a planetary cone which can rotate on said input shaft in revolution around the axial center of the input shaft and in rotation around its axial center inclined with respect to said axial center of the input shaft, said planetary cone having a first part of nearly conical shape, and a second part of nearly cylindrical shape leading to a bottom surface of the first part, and first, second and third frictional transmission surfaces being formed on the conical surface of the first part, the bottom periphery of the first part and the circumferential surface of the second part, respectively;

an input transmission member installed rotatable with said input shaft and engaged at outer periphery in frictional engagement with the second frictional transmission surface of said planetary cone;

an orbit ring installed non-rotatably with respect to said stationary element, said orbit ring extending along the revolution path of said planetary cone and having an annular frictional engaging surface to be engaged in frictional engagement with the third frictional transmission surface of said planetary cone;

a shifting ring supported on said transmission output member and movable only in the axial direction thereof and having a frictional engaging surface engaged in frictional engagement with the first frictional transmission surface of said planetary cone always within the movable region in the axial direction;

a hydraulic piston/cylinder assembly for setting the position of said shifting ring adjustably toward or away from the rotation center of said planetary cone; and a Pitot tube for supplying the inside of a hydraulic cylinder of said hydraulic piston/cylinder assembly with hydraulic pressure corresponding to the rotational speed of said transmission output member.

2. A device as set forth in claim 1, wherein said input shaft, said transmission output member and said orbit ring constitute an annular closed space for housing said planetary cone, said input transmission member, said gear shifting ring, said hydraulic piston/cylinder assembly and said Pitot tube, and said closed space is filled with a frictional transmission oil.

3. A device as set forth in claim 2, wherein said frictional transmission oil is used as a working fluid to supply said hydraulic cylinder with hydraulic pressure by action of said Pitot tube.

4. A device as set forth in claim 1, wherein said shifting ring is guided along a plurality of key grooves formed on the inner circumferential surface of said transmission output member and extending along the axial direction thereof.

5. A device as set forth in claim 1, wherein said transmission output member is a pulley.

* * * * *